UNITED STATES PATENT OFFICE.

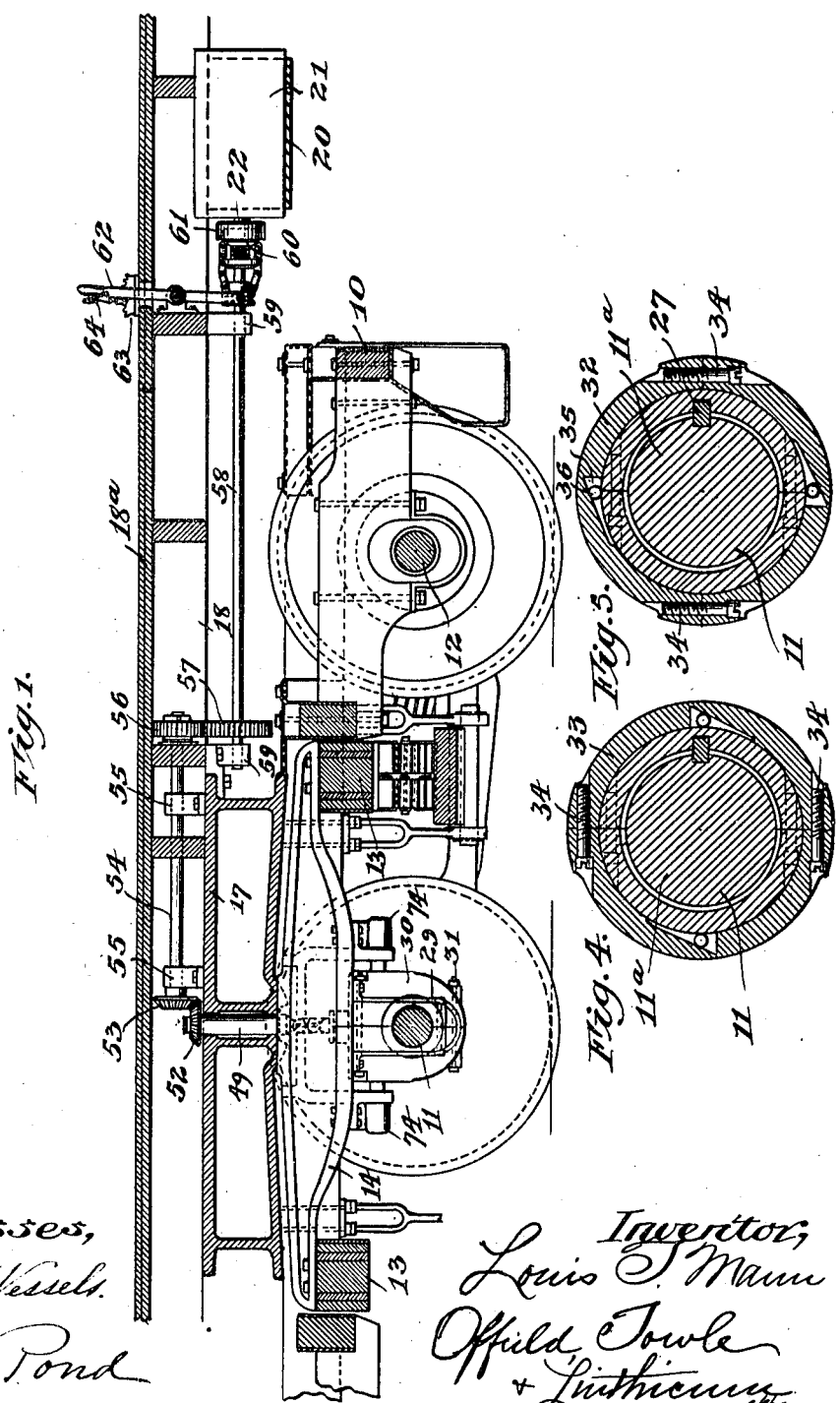

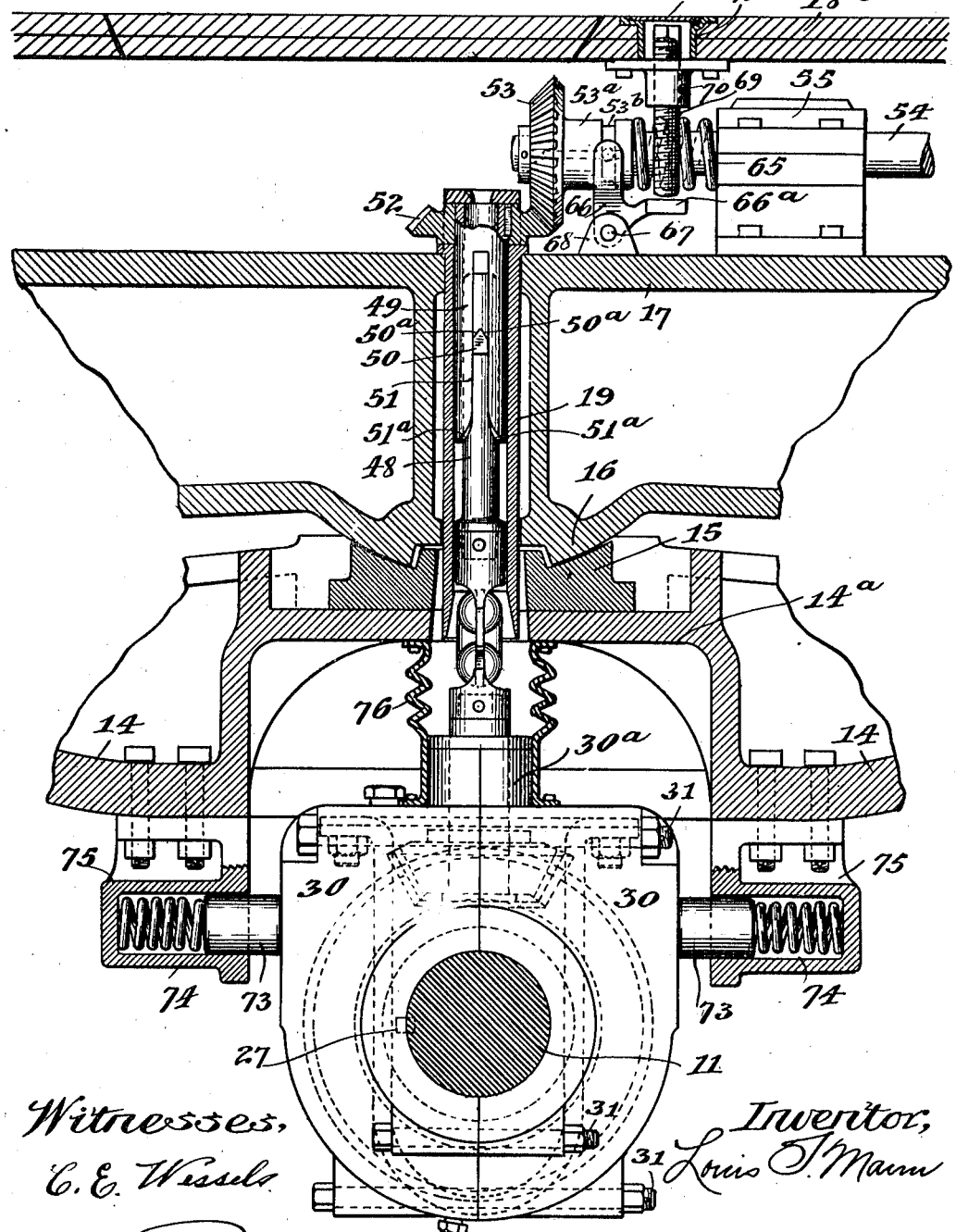

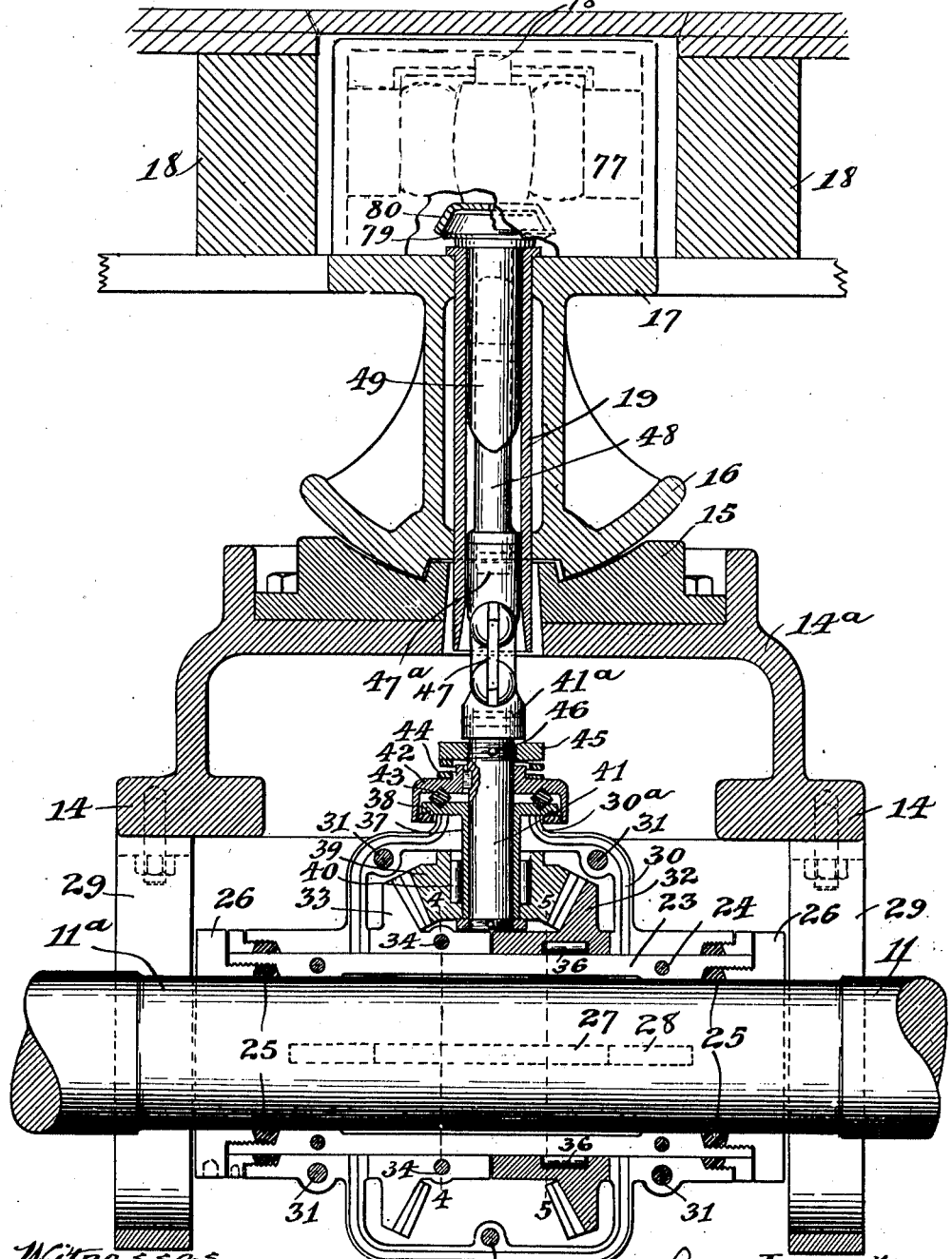

LOUIS T. MANN, OF CHICAGO, ILLINOIS.

MEANS FOR TRANSMITTING POWER FROM AXLES TO BODIES OF RAILWAY-CARS.

1,019,903. Specification of Letters Patent. Patented Mar. 12, 1912.

Application filed June 3, 1907. Serial No. 376,963.

*To all whom it may concern:*

Be it known that I, LOUIS T. MANN, a citizen of the United States, residing at Chicago, in the county of Cook and State of Illinois, have invented certain new and useful Improvements in Means for Transmitting Power from Axles to Bodies of Railway-Cars, of which the following is a specification.

This invention relates to means for transmitting power from the axles to bodies of railway cars, being especially adapted for electrically lighting and heating such cars, and has for its general object to provide a practical and efficient construction whereby power may be transmitted from one of the axles of the car truck to the dynamo electric generator carried by the car body proper, the mechanism being of such a character that the transmission of the motion will be unaffected by the direction of rotation of the axle and the variations and relative distance and position between the car body and axle which occur in practice when the car is in motion.

My present invention is based upon the fundamental principle of operation disclosed in the mechanism forming the subject-matter of Letters Patent No. 633,385, granted to me September 19, 1899, wherein the power is transmitted from the car axle to the dynamo generator located above the floor of the car body by and through transmitting means occupying a position axially coincident with the axes of the body and truck bolster center bearings.

In some kinds or classes of cars it is impracticable or undesirable to locate the electric generator above the car floor, owing to lack of space and other considerations, and one important object of my present improvements is to provide a practical construction wherein the dynamo generator may be located beneath the floor of the car and, at the same time, be driven by mechanism embodying the operative principle of that disclosed in my former patent above referred to.

Other objects of the present invention are to improve the reliability and easy running qualities of the power-transmitting mechanism between the car axle and dynamo and to render the same more perfectly automatic and self-adjusting in character and non-susceptible to the wide range of variations of position and movement constantly occurring between the car axle, the truck frame, and the body bolster when the car is in rapid motion.

Still other and minor objects are to provide means adapted to prevent breaking strains on the power-transmitting elements under comparatively sudden changes in speed, as well as to provide improved means for regulating the speed at which the generator may be driven irrespective of the speed of rotation of the axle, so as to prevent overheating and other possible injury of the former.

To these and other ends the invention consists in certain novel features, which I will now proceed to describe, and will then particularly point out in the claims.

In the accompanying drawings, Figure 1 is an elevational view, partly in vertical section, of a portion of a six-wheel car truck and the immediate superposed portion of the floor frame and body bolsters of the car body having my present improvements applied thereto. Fig. 2 is an enlarged detail view partly in elevation and partly in vertical section through the center bearings of the body and truck bolsters, in a plane transverse to the car axle, and illustrating a modification of the disconnecting means between the dynamo and its power-transmitting mechanism as compared with Fig. 1. Fig. 3 is a view similar to Fig. 2 but in a plane at right angles to the plane of the latter figure, and in section through the axle gears and gear casing, and further illustrating another position of the generator directly above the center bearings. Figs. 4 and 5 are detail cross-sectional views on the lines 4—4 and 5—5 of Fig. 3, respectively, more particularly illustrating the sectional character of the axle gears and the automatic clutch mechanism between said gears and the axle.

In the accompanying drawings I have illustrated my improvements as applied to and in connection with a six-wheel truck, although it will be understood that the same are equally applicable to the common four-wheel truck through the interposition of additional power-transmitting mechanism between either axle and the vertical center of the truck frame, such as is shown in my former patent above referred to. Referring to the drawings, 10 may designate as an entirety the truck frame, 11 the center axle, 12 one of the end axles, 13 the spring beams, and 14 the center bolster of a standard type of six-wheel truck. These, and the other parts and accessories of the truck, which need not be herein specifically described, are of the usual form and construction, with the exception that the center truck bolster 14 is, as more particularly shown in the detail views Figs. 2 and 3, provided with a central arch or dome 14$^a$ to provide space for certain elements of the power-transmitting gearing. The dome 14$^a$ of the truck center bolster carries the usual center plate 15, with which coöperates the depending center plate 16 of the body bolster 17 that is secured to and beneath the longitudinal sills 18 of the under frame of the car, the floor of which is indicated at 18$^a$. The truck bolster, center plates, and body bolster are centrally apertured, as usual, to provide for the passage of the king-bolt 19 which, in this instance, is made hollow or tubular to provide for the passage therethrough of certain elements of the power-transmitting mechanism.

Suitably secured to the under side of the floor frame of the car, as by a depending bracket 20 is a dynamo electric generator indicated at 21 so disposed that its armature shaft 22 lies longitudinally of the car frame. The dynamo is driven by power-transmitting devices from the center axle 11 upwardly through the tubular king-bolt 19 and thence laterally off to the dynamo by the following described mechanism. On the inner reduced portion 11$^a$ of the axle 11, as shown in Fig. 3, is mounted a bearing sleeve 23 preferably made in two parts united by bolts 24 for convenience of application and having its ends sealed by packing rings 25 and glands 26. The bearing sleeve 23 is splined to the axle so as to partake of the rotary movements of the latter while nevertheless having a relative sliding movement thereon to accommodate the endwise movement of the axle relatively to the truck frame which occurs when the car is in motion, as by means of a feather 27 on one of said parts engaging a longitudinal slot 28 on the other; the bearing sleeve 23 being itself confined practically against endwise movement by U-shaped hangers 29 depending from the opposite sides of the center truck bolster 14. Embracing the bearing sleeve 23 is a gear casing 30 preferably made in two or more parts united by tie-bolts 31 for convenience of application. Within this casing and surrounding the bearing sleeve 23 are a pair of oppositely and inwardly facing bevel gears 32 and 33, said gears being also preferably, and as more particularly shown in Figs. 4 and 5, made each in a pair of mating semi-circular parts united by bolts or screws 34 for convenience of application to the bearing sleeve. The hub of each of the gears 32 and 33 is provided with an internal clutch mechanism of a well known type consisting of one or more acute angled pockets 35 within which are contained rollers 36, whereby a turning movement of the sleeve in one direction wedges the rollers 36 between the inclined wall of the pocket and the surface of the sleeve, thereby rendering the gear fast with the sleeve, while a turning movement of the sleeve in the opposite direction releases the clutch engagement of the rollers and permits the sleeve to turn free and independent of the gears. The clutch devices of the two gears 32 and 33 are inversely or oppositely disposed so that when the axle 11 is turned in one direction the gear 32 is driven while the gear 33 is idle, and when the axle 11 turns in the opposite direction the gear 33 is driven and the gear 32 is idle.

The gear casing 30 has a central upwardly extending hollow neck portion 30$^a$, within which is fitted a sleeve 37 having at its upper end an annular flange 38 and carrying on its lower end within the gear casing a horizontally disposed bevel gear 39 that meshes on opposite sides with the gears 32 and 33. The gear 39 is preferably held on the sleeve 37 through the agency of a roller clutch mechanism indicated at 40 similar to that shown and described in connection with the gears 32 and 33, said clutch mechanism being so arranged and disposed as to render the gear 39 fast with the sleeve 37 in the direction of drive imparted by the gears 32 and 33, but permitting the driven sleeve 37 to turn freely in the gear 39 in case the momentum of the driven parts tends to rotate the sleeve 37 at a higher speed than that at which it is normally driven by the gear 39, thereby eliminating strain on the gear teeth in the event of a sudden stopping or slowing down of the axle and the parts directly driven thereby. Within the sleeve 37 is rotatably fitted a vertical shaft section 41, on the upper portion of which is keyed or splined a friction clutch member 42 adapted to be driven from the sleeve 37 through the intervention of a friction ring 43 fitted to annular mating grooves or channels formed in the opposed faces of the flange 38 and superposed clutch member 42; the clutch member 42 being normally pressed into driven engagement with the friction ring 43 by a compression spring confined between the upper side of the member 42 and a collar 45 keyed or pinned as at 46 to the shaft section 41.

The purpose of the last described mechanism is to provide a driving connection between the positively driven sleeve 37 and the shaft section 41 that will drive the latter positively up to a certain speed limit of the driving parts, but beyond that limit will afford a degree of slip or yield that will prevent the driving of the dynamo at an undue or injurious speed. The upper end of the shaft section 41 is squared as indicated at 41ª and engages a correspondingly shaped socket in a flexible universal joint coupling member 47, this latter being of a well known construction not requiring particular description. The upper end of the flexible coupling member 47 has a squared socket 47ª into which fits the correspondingly shaped lower end of a two-part extensible and contractible vertical shaft consisting of lower and upper telescoping members 48 and 49, respectively, that are housed in the tubular king-bolt 19 and are suitably connected to turn together through a transverse key 50 on the member 48 projecting at its ends from opposite sides of the latter and slidingly engaging a pair of longitudinal slots 51 in opposite sides of the member 49 (Fig. 2).

It will be observed that the lower or entrance ends of the slots 51 are tapered or beveled as shown at 51ª, while the upper edges of the projecting ends of the key 50 are likewise beveled or tapered as shown at 50ª, the purpose and effect of this construction being to automatically effect the engagement of the coöperating key and slots when the telescoping parts are brought together, irrespective of the particular relative positions in which said parts may meet each other; the advantage of this construction being that no exact preliminary registration of the telescoping members in order to effect their union is necessary, since they will automatically engage each other irrespective of their particular meeting positions. On the upper end of the upper shaft section 49, and above the upper end of the tubular king-bolt 19 is shrunk or keyed a bevel gear 52 that meshes with and drives a companion bevel gear 53 on the adjacent end of a horizontal shaft 54 that is journaled in suitable bearings 55 resting on the upper side of the body bolster 17, the other end of said shaft 54 carrying a plain spur gear 56 that meshes with an underlying companion gear 57 on the adjacent end of a countershaft 58 journaled in depending brackets 59 from the under side of the floor frame, the other end of said shaft 58 carrying a suitable friction or other clutch member 60 adapted to coöperate with a companion clutch member 61 on the armature shaft of the dynamo 21, said clutch being operated by a laterally offset lever 62 equipped with the usual segment 63 and pawl 64.

In some cases it may be desirable to interrupt the driving mechanism at a point nearer the source of power, so as to obviate the necessity of driving the entire train of mechanism when the dynamo is thrown out of commission. I have illustrated in Fig. 2 an alternative disconnecting or interrupting means adapted to break the continuity of the driving connections between the two bevel gears 52 and 53. In this case the hub 53ª of the gear 53 is slidably splined on the shaft 54 and is normally pressed into driving engagement with the companion gear 52 by a compression spring 65 interposed between the hub 53ª of the gear and the bearing bracket 55. The hub 53ª of the gear 53 has an annular groove 53ᵇ engaged by the forked upper end of a short bell-crank lever 66 pivoted at 67 in a lug 68 mounted on the body bolster and having a laterally projecting arm 66ª underlying the lower end of a rod 69 threaded through a bearing 70 secured to the under side of the car floor and provided at its upper end with any suitable turning means. Preferably, in order to prevent manipulation of this member by unauthorized persons, the threaded adjusting rod 69 terminates beneath the upper surface of the floor within a socket member 71 provided with a suitable lid or closure 72, and is squared as indicated at 69ª to form a wrench-hold for a spanner or other suitable form of wrench. By raising the lid 72 and applying the wrench the rod 69 can be turned so as to lower the same and thus actuate the bell-crank 66 in a manner to retract and hold retracted the gear 53 out of engagement with its companion driving gear 52. The gear 53 is reversely moved into engagement with the gear 52 through the action of the spring 65 when the rod 69 is adjusted upwardly by the means described sufficiently to permit such movement on the part of the gear 53.

The gear casing 30 is supported against rotation on the bearing sleeve 23 by any suitable means, those herein shown for such purposes consisting of short spring-pressed plungers 73 slidably mounted in pockets 74 formed in depending brackets 75 suitably secured to the under side of the center truck bolster on either side of the gear casing, respectively. The plungers 73, being spring-pressed, and engaging the opposite sides of the gear casing, support the latter against rotation and at the same time permit such slight yielding of the gear casing to either side of the axle as may be necessary or expedient to avoid strain upon the driving and driven parts carried thereby. A flexible boot 76 is also secured at its upper and lower ends to the under side of the dome 14ª of the center bolster and the upper side of the gear casing surrounding the driving elements between said parts to guard them against dust and grit.

The operation of the mechanism as thus far described has already to a considerable extent been indicated in connection with the description of such mechanism, but may be briefly set forth as follows. One of the gears 32 and 33, according to the direction in which the axle is turning, when the car is in motion, imparts a direct drive to the horizontal gear 39, the other axle gear being idle. Through the clutch mechanism 40 the rotary movement of the gear 39 is imparted to the sleeve 37 and its flange 38 forming the lower element of the friction clutch, and through the friction ring 43 and upper clutch member 42 this rotary movement is transmitted to the central short shaft section 41, from which the driving impulse is transmitted to the superposed shaft sections passing through the tubular king-bolt, the universal joint member or coupling 47 taking care of any lateral vibration in any direction and thus relieving the telescoping sections 48 and 49 within the king-bolt of any lateral strains. Likewise the telescoping sections last mentioned, through their free longitudinal play relative to each other, take care of vertical vibrations between the car-body and the truck. From the bevel gear 52 on the upper end of the upper shaft section 49 the power is transmitted through the simple driving connections described and shown to the armature shaft of the dynamo when the clutch members 60 and 61 are engaged with each other. In case the speed of the axle reaches a point at which it would drive the dynamo at an undesirably high rate of speed, the friction clutch between the sleeve 37 and the shaft section 41 comes into play to automatically prevent the transmission of such excessive speed to the armature shaft. It will be understood, of course, that this friction clutch or any similar device might be placed at any other convenient point in the line of power transmission, but its location as shown is preferred where it is near the source of power.

In Fig. 3 I have illustrated a modification in the manner and place of mounting the dynamo generator designed to somewhat shorten the train of driving mechanism between the generator and the source of power. In said figure I have indicated a generator 77 having a vertical armature shaft 78 mounted on the truck bolster directly above and in axial alinement with the vertical transmitting elements from the truck. As herein shown the upper telescoping shaft section 49 is provided with a friction clutch member 79 adapted to engage and drive a companion clutch 80 on the lower end of the armature shaft. Of course, the dynamo might be otherwise located on or in the bolster and its armature shaft otherwise connected to and driven from the driving connections passing through the tubular king-bolt; but I have shown herein in an illustrative manner only a simple manner of mounting the dynamo directly on the body bolster instead of at a more remote position beneath the car body.

In practice the running parts of the mechanism will, of course, be suitably lubricated, either by packing or incasing them in grease or feeding oil thereto as may be required.

It will be observed as constituting an important feature of improvement attained by the present invention that the dynamo generator is located wholly at a point beneath or below the car floor, thus not occupying any otherwise available space within the car itself; while at the same time the advantages of the driving connection through the center bearings and king-bolt where the minimum vibration occurs, as explained in my prior patent hereinabove referred to, are preserved. Doubtless other locations for the dynamo beneath the car floor will be found practical and expedient in practice, and hence it should be understood that the invention is by no means limited either to the particular locations of the dynamo as herein shown or to the particular and specific driving connections disclosed, except to the extent clearly indicated in specific claims.

I claim:

1. In a mechanism of the character described, the combination with a car-body and a truck, of a dynamo located beneath the floor of the car-body, and power-transmitting mechanism extending from an axle of the truck to said dynamo and in part disposed substantially coincident with the vertical axis or center of relative movement of the truck and car-body, substantially as described.

2. In a mechanism of the character described, the combination with a car-body and a truck, of a dynamo located beneath the floor of the car-body, power-transmitting gearing connected to said dynamo and in part disposed substantially coincident with the vertical axis or center of relative movement of the truck and car-body, and means actuated by an axle of the truck for driving said power-transmitting gearing always in one direction irrespective of the direction of rotation of said axle, substantially as described.

3. In a mechanism of the character described, the combination with a car-body and a truck, of a dynamo located beneath the floor of the car-body, a power-transmitting shaft disposed substantially coincident with the vertical axis or center of relative movement of said truck and car-body, gearing connecting the upper end of said shaft with said dynamo, and gearing carried by an axle of the truck and connected to the lower end of said shaft, said last-named gearing being adapted to drive said shaft always is the same direction irrespective of the direction of rotation of said axle, substantially as described.

4. In a mechanism of the character described, the combination with a car-body and a truck, of a dynamo located beneath the floor of the car-body, a power-transmitting shaft disposed substantially coincident with the vertical axis or center of relative movement of said truck and car-body, gearing connecting the upper end of said shaft to said dynamo, a gear on the lower end of said shaft, a pair of gears on an axle of the truck in driving engagement with opposite sides of said last-named gear, and automatic oppositely acting clutch connections between said axle gears and the axle, substantially as described.

5. In a mechanism of the character described, the combination with a car-body and a truck, of a dynamo located beneath the floor of the car-body and having a substantially horizontal armature shaft arranged longitudinally of the car-body, a power-transmitting mechanism extending from an axle of the truck to said armature shaft, said power-transmitting mechanism including a part disposed substantially coincident with the vertical axis or center of relative movement of the truck and car-body, and a part extending beneath and longitudinally of the car-body and connected to said armature shaft, substantially as described.

6. In a mechanism of the character described, the combination with a car-body and a truck connected thereto at its center, of a shaft extending axially through the center bearing of said car-body and truck, a gear on the lower end of said shaft, means on an axle of the truck for driving said gear, and a speed-controlling device between said gear and said shaft adapted to limit the speed of the latter, substantially as described.

7. In a mechanism of the character described, the combination with a car-body and a truck connected thereto at its center, of a flexible and extensible shaft extending axially through the center bearing of said car-body and truck member, a gear on the lower end of said shaft, means on an axle of the truck for driving said gear in one direction irrespective of the direction of the movement of said axle, and a speed-controlling device between said gear and said shaft adapted to limit the speed of the latter, substantially as described.

8. In a mechanism of the character described, the combination with a car-body and body-bolster, of a six-wheel truck, a truck bolster having a central dome-shaped portion between the center bearing and the middle axle, a vertical power-transmitting shaft axially coincident with the center of said center bearing and extending upwardly through said truck and body-bolsters, and driving mechanism for said shaft mounted on said middle axle within and beneath the dome of said truck bolster, substantially as described.

9. In a mechanism of the character described, the combination with a car truck, of a power-transmitting gear mounted on an axle of said truck, a gear-casing surrounding said gear, and means for preventing rotation of said gear-casing on said axle, comprising spring-pressed plungers mounted in the truck frame and engaging opposite sides of said gear casing, substantially as described.

10. In a mechanism of the character described, the combination with a car truck, of a power-transmitting gear mounted on and rotatable with an axle of said truck by means permitting sliding movement of said axle therethrough, and means continuously operative to confine said gear against bodily movement longitudinally of said axle, substantially as described.

11. In a mechanism of the character described, the combination with a car truck, of a bearing sleeve splined on an axle of said truck, a gear mounted on said bearing sleeve, a gear-casing surrounding said gear, means for preventing rotation of said gear-casing, and means to confine said bearing sleeve and gear-casing against bodily movement lengthwise of said axle, substantially as described.

12. In a mechanism of the character described, the combination with a car truck and truck bolster, of a bearing sleeve splined on an axle of said truck, a gear mounted on said bearing sleeve, a gear-casing surrounding said gear, means for preventing rotation of said gear-casing, and stops depending from said truck bolster and confining said gear-casing and bearing sleeve against bodily movement lengthwise of said axle, substantially as described.

13. In a power-transmitting mechanism of the character described, a two-part, extensible and contractible shaft comprising a pair of telescoping members provided, the one with one or more longitudinal slots having tapered or beveled lower edges and the other with one or more keys to engage said slot or slots and having beveled or tapered upper edges, whereby when said members are telescoped said coöperating parts automatically pass into engagement with each other, substantially as described.

LOUIS T. MANN.

Witnesses:
SAMUEL N. POND,
FREDERICK C. GOODWIN.